Oct. 30, 1928. 1,689,548

G. A. CLARK

AUTOMOBILE VISOR

Filed Aug. 19, 1925 3 Sheets-Sheet 1

Inventor
GEORGE A. CLARK,
By Jerry A Mathews
Attorney

Oct. 30, 1928.
G. A. CLARK
1,689,548
AUTOMOBILE VISOR
Filed Aug. 19, 1925
3 Sheets-Sheet 2
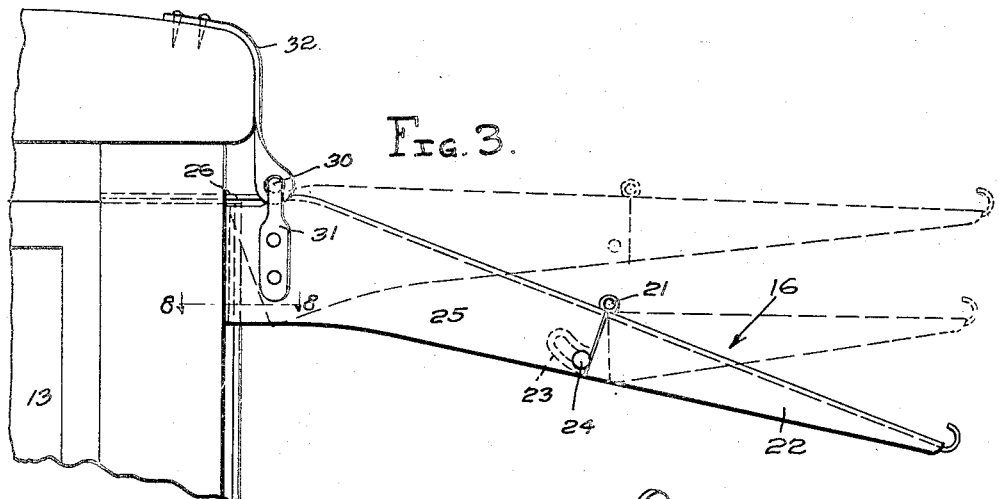
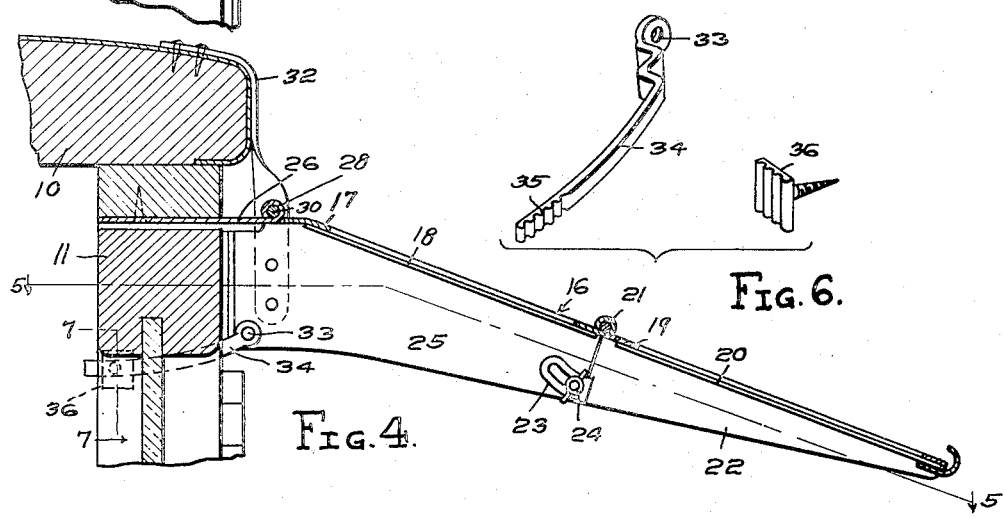
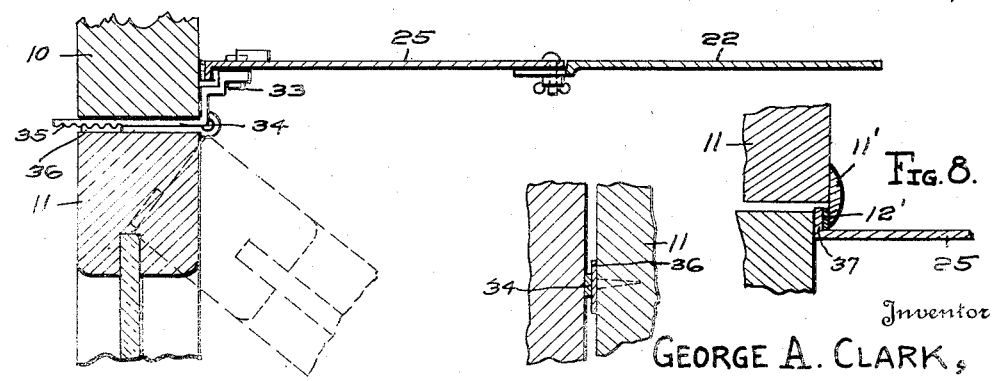
Inventor
GEORGE A. CLARK,
By Jerry A Mathews
Attorney Oct. 30, 1928.

G. A. CLARK 1,689,548

AUTOMOBILE VISOR

Filed Aug. 19, 1925     3 Sheets-Sheet 3

Inventor
GEORGE A. CLARK,
By Jerry A. Mathews
Attorney

Patented Oct. 30, 1928.

1,689,548

UNITED STATES PATENT OFFICE.

GEORGE A. CLARK, OF ELWOOD, NEBRASKA.

AUTOMOBILE VISOR.

Application filed August 19, 1925. Serial No. 51,253.

My invention relates to visors for use upon automobiles, and has particular reference to improvements in visors, adapted for use in connection with the doors of closed cars.

An important object of the invention is to provide a visor for use in connection with the swinging door of an automobile, which visor is so constructed that it will properly shade the eyes, and afford a proper line of vision and will automatically move downwardly or upwardly, upon the opening of the door, so that it will not interfere with persons entering or leaving the automobile, nor engage with the adjacent stationary visor.

A further object of the invention is to provide means to securely hold or lock the adjustable visor in the active position, when the door of the automobile is closed.

Other objects and advantages of the invention will be apparent during the course of the following description.

Figure 1:
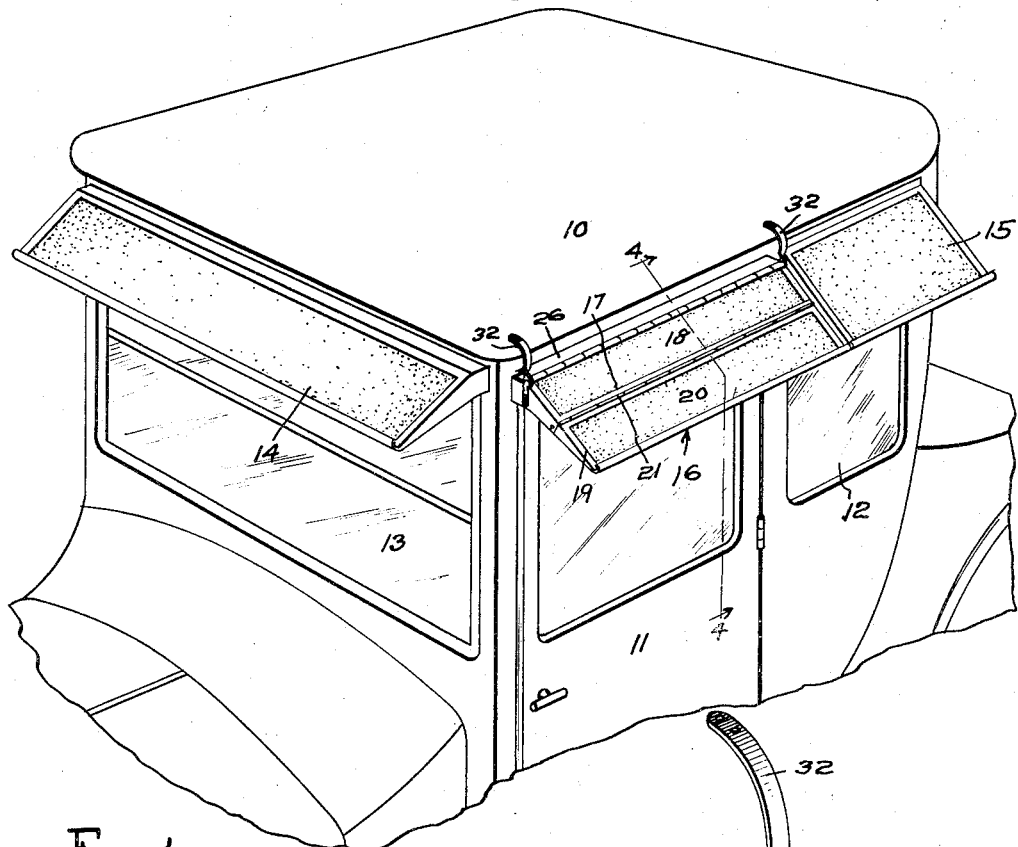
Figure 2:
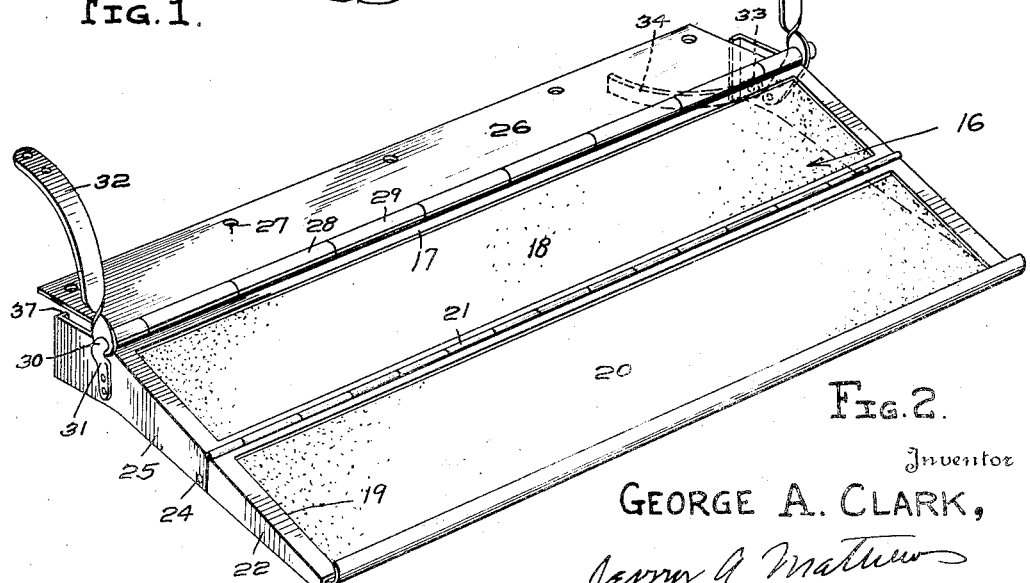
Figure 9:
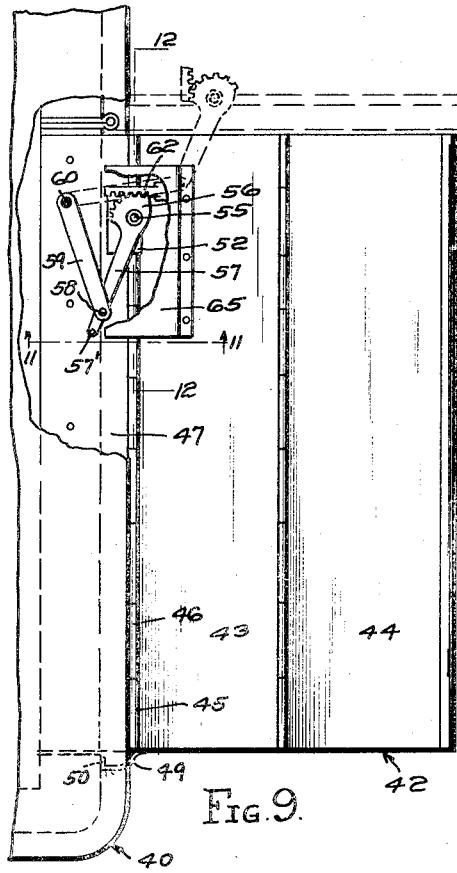
Figure 11:
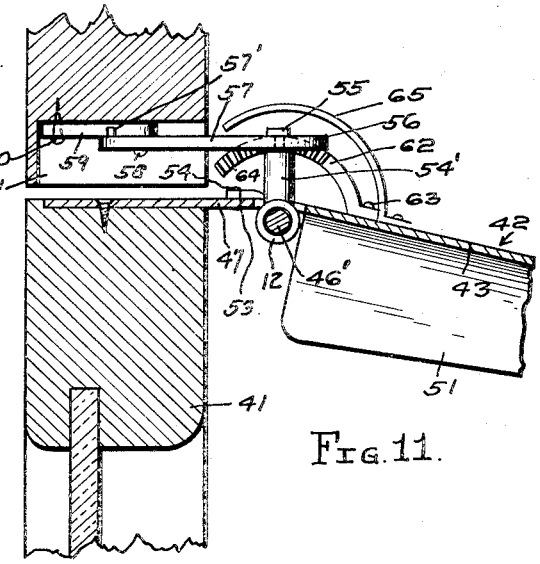
Figure 10:
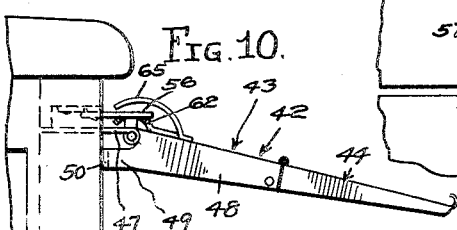
Figure 12:
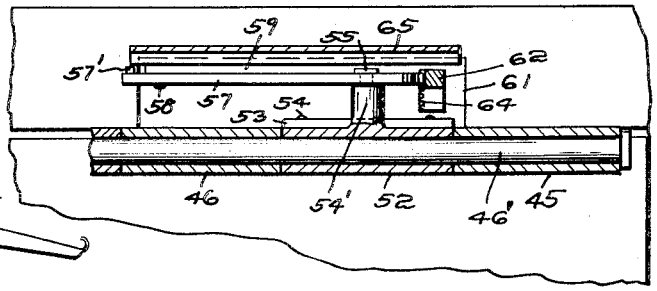
Figure 13:
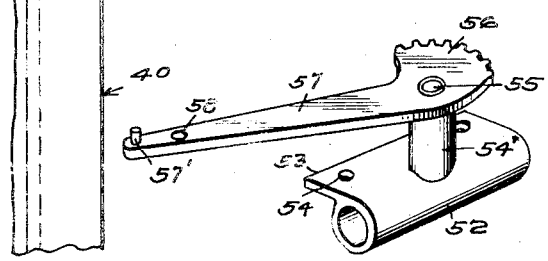

In the accompanying drawings forming a part of this specification and in which like numerals are employed to designate like parts throughout the same:

Figure 1 is a perspective view of a visor embodying my invention, showing the same applied to an automobile, Figure 2 is a similar view, removed from the automobile, Figure 3 is an end elevation of the visor, Figure 4 is a transverse section taken on line 4—4 of Figure 1, Figure 5 is a horizontal section taken on line 5—5 of Figure 4, Figure 6 is a perspective view of the elements of a lock, Figure 7 is a detailed section taken on line 7—7 of Figure 4, Figure 8 is a detailed horizontal section taken on line 8—8 of Figure 3, Figure 9 is a plan view, parts broken away, of a modified form of visor embodying my invention, Figure 10 is an end elevation of the same, Figure 11 is a transverse vertical section taken on line 11—11 of Figure 9, Figure 12 is a longitudinal vertical section taken on line 12—12 of Figure 9, and Figure 13 is a perspective view of the operating gear.

In the drawings, wherein for the purpose of illustration is shown a preferred embodiment of my invention, the numeral 10 designates the body of a closed automobile, having the usual side door 11, window 12, wind shield 13, and front stationary visor 14.

I contemplate arranging a stationary visor 15, over the window 12.

My invention resides particularly in the construction of an adjustable visor 16, which is arranged over the swinging door 11. This adjustable visor embodies an inner section, including a frame 17, receiving and holding a strip or pane 18, of opaque material, such as fiber or the like. The outer section of the visor embodies a frame 19, receiving and holding a pane 20, of opaque material, such as fiber or the like. The inner and outer frames 17 and 19 are connected at their adjacent edges by means of a hinge 21. The side flanges 22 of the outer frame are provided with slotted tongues 23, rigidly attached thereto, and these slotted tongues receive clamping bolts 24, carried by the depending flanges 25 of the inner frame 17. It is thus seen that the outer section of the visor may be angularly adjusted with respect to the inner section, and by proper manipulation of the clamping bolts, the outer section may be locked to the inner section, at the selected adjusted positions.

The visor 16 is arranged above and outwardly of the door 11, as stated, and a strap or plate 26 is arranged within the top of the door opening, and secured to the top part of the door frame, by screws or the like, passing through openings 27. The strap 26 carries knuckles 28, for co-action with knuckles 29, carried by the frame 17, and these knuckles are pivotally connected by means of a pivot rod 30, having its ends bent downwardly into cranks 31, which are preferably flattened, and riveted or otherwise rigidly attached to the flanges 25. The pivot rod 30 is also pivotally mounted within rigid metal straps 32, extending upwardly and rigidly attached to the top of the body 10 of the automobile, as shown. In view of the foregoing description, it will be seen that the visor is hinged to the top of the body of the automobile, above the swinging door.

Pivotally connected with one flange 25, as shown at 33, is a curved lock-link 34, which extends between the door and the side of the door jamb, and has its inner end serrated, as shown at 35, for engagement with the serrated plate 36, rigidly attached to the side or edge of the door. It is thus seen that when the door is closed the plate 36 engages the serrated end of the lock-link, holding it against longitudinal movement, whereby it will in turn hold the visor, at its corresponding end, against swinging movement. The inner end of the flange 25 to the left, is adapted to engage the outer surface of the door jamb, outwardly of and adjacent to the door 11, thereby supporting the visor against downward movement. The inner end of the outer flange 25, at the right or free edge of the door is adapted to engage with the outer surface of the door jamb, thereby supporting the corresponding end of the visor against downward movement. This flange is also provided with an inwardly bent lip 37, disposed in the path of travel of the lip 11' of the door. The lip 11' may be equipped with a strip of rubber 12' or the like to insure a close fit. When the door 11 is swung inwardly, it will cause its lip 11' to engage with the lip 37, thereby first swinging the visor to the lower position, and then positively holding or locking the forward end of the visor frame, against upward movement. It is thus seen that means are provided to securely hold both ends of the visor, thereby eliminating rattling.

When the door 11 is moved outwardly, the serrated plate 36 disengages the serrated end 35 of the lock-link 34, and further, the lip 11' of the door disengages the lip 37. As the door is moved outwardly, its upper end slidably engages the lower inclined surface of the visor, which projects below the elevation of the top of the door, raising it gradually, so that it will be positioned at the elevation of the top of the door, and not obstruct the door way.

Attention is now called to Figures 9 to 12 inclusive, wherein a second form of the invention is shown. In these figures, the numeral 40 designates the body of the automobile, having the usual side door opening or openings. The side door opening is closed by the usual horizontally swinging door 41, hinged at its rear edge.

In the present form of invention, the numeral 42 designates the visor, as a whole, which may be formed of any suitable material. This visor is of substantially the same construction as the visor described in connection with the first form of the invention, and embodies inner and outer sections 43 and 44. The inner visor section is provided at its inner longitudinal edge with knuckles 45, interfitting with knuckles 46, formed upon an attaching leaf 47, which is rigidly secured to the top of the door 41, there being sufficient space provided for this purpose. The knuckles are pivotally connected by a rod 46'.

The visor is therefore hinged to the door to swing bodily with it, and to swing in a vertical plane with relation to it. The visor section 43 is provided at its forward end with a depending flange 48, carrying extension 49, provided with a laterally extending lip 50, adapted to engage the outer surface of the body 40 of the automobile, and this lip is adapted to be positioned behind the usual edge flange or lip carried by the door, such as the lip 11' shown in Figure 8 of the drawings. In comparing Figures 8 and 9 of the drawings, the element 50 in Figure 9, corresponds to the element 37 in Figure 8, and element 49 to element 25. The same lip 11' is used in both constructions. When the door is closed, the visor is therefore rigidly supported against downward movement, below the normal position, and is also held against upward movement, by the lip 11'. At its rear end, the visor section 43 has a depending flange 51, which terminates adjacent to the knuckles 12.

One of the knuckles 45 is omitted, and a support knuckle 52 is substituted therefor, upon the pivot rod 46. This support knuckles carries a leaf 53, arranged upon and rigidly attached to the leaf 47, as shown at 54. Rising from the support knuckles 52 and preferably formed integral therewith is a vertical boss 54', carrying at its upper end a vertical pivot 55, upon which is mounted a horizontally swinging operating gear element 56. This gear element is provided with a lever or arm 57, preferably integral therewith. Pivotally connected with the lever or arm 57, at 58, is a link 59, the opposite end of which is pivotally connected with the top of the door jamb, as shown at 60. A recess or space 61 is cut in the top of the door jamb, to receive a lever 57 and link 59, as shown. The lever 57 extends outwardly beyond the pivot 58 and is provided with a stop lug 57', disposed to contact with the edge of the link 59, when the door is moved to substantially the open position, and the device therefore functions as a check to limit the outward swinging movement of the door.

Co-acting with the operating gear element 56 is a curved or arched rack or gear element 62, which is rigidly attached to the visor section 43, as shown at 63. This rack is provided upon its vertical side with teeth 64, in permanent mesh with the teeth of the gear element 56. The gear element and operating parts are preferably covered by a guard 65, attached to the visor section 43.

The operation of the apparatus is as follows:

When the door 41 is in the closed position, the visor 42 is in the normal elevated position, and the lip 50 engages the body of the automobile, behind the lip 11', and hence the visor is securely locked in the normal position. When the door is opened the lip 50 swings out of engagement with the body 40 of the automobile, and being upon the inner side of the lip, it is free to swing inwardly away from the same. As the door is swung to the open position, the lever 57 and link 59 straighten out, as indicated in dotted lines in Figure 9, with the result that the gear element 56 is turned with respect to the rack 62, and the turning action is such that the visor is lowered to a substantially vertical position. The visor is thus out of the way, and will not obstruct the door way, and will not contact with the stationary visor, such as the visor 15, Figure 1, which may be arranged adjacent one end thereof. When the door is closed, the reverse of this operation occurs, and the visor is returned to the normal elevated position. When the door is swung to the open position, the stop lug 57' will engage with the edge of the link 59, and the operating device will then serve as a check for the further opening movement of the door.

It is to be understood that the forms of my invention herewith shown and described are to be taken as a preferred example of the same, and that various changes in the shape, size and arrangement of parts may be resorted to without departing from the spirit of my invention or the scope of the subjoined claims.

Having thus described my invention, I claim:—

1. The combination of an automobile body having a swinging door, of a visor pivotally connected with the top of the door to swing in a vertical plane, a gear element attached to the visor, a co-acting gear element mounted upon the door, a lever connected with the co-acting gear element, and a link connected with the lever and with the body.

2. The combination with an automobile body having a swinging door provided with a lip adapted to be arranged outwardly of and adjacent to said body of a vertical swinging visor pivoted near the top of the door, an extension carried by one end of the visor and adapted to engage with the exterior of the body and having a laterally extending lip to engage beneath the lip of the door, and means whereby the visor is swung upon its pivot when the door is opened.

3. The combination with an automobile body having a swinging door provided with a lip adapted to be arranged outwardly of and adjacent to said body, of a vertically swinging visor pivoted near the top of the door and an extension carried by the visor to engage with the exterior of said body and provided with a laterally extending lip to engage behind the lip of the door.

4. The combination with an automobile body having a horizontally swinging door, of a visor pivotally connected with the top of the door to swing in a vertical plane, a horizontally swinging gear element pivoted to the top of the door and having a lever rigidly secured thereto, a vertically swinging gear element attached to the visor to move the same and engaging the first named gear element, a link pivotally connected with the lever and with said body, and a stop element to limit the swinging movement of the lever.

In testimony whereof I affix my signature.

GEORGE A. CLARK.